(12) United States Patent
Tezaur

(10) Patent No.: US 10,290,083 B2
(45) Date of Patent: *May 14, 2019

(54) MULTIPLE PHASE METHOD FOR IMAGE DECONVOLUTION

(71) Applicant: NIKON CORPORATION, Tokyo (JP)

(72) Inventor: Radka Tezaur, Belmont, CA (US)

(73) Assignee: NIKON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,031

(22) Filed: Feb. 21, 2018

(65) Prior Publication Data

US 2018/0182077 A1    Jun. 28, 2018

Related U.S. Application Data

(63) Continuation of application No. 14/908,441, filed as application No. PCT/US2014/047620 on Jul. 22, 2014, now Pat. No. 9,928,579.

(Continued)

(51) Int. Cl.
*G06T 5/00* (2006.01)
*G06T 5/20* (2006.01)
*G06T 5/50* (2006.01)

(52) U.S. Cl.
CPC ............... *G06T 5/003* (2013.01); *G06T 5/20* (2013.01); *G06T 5/50* (2013.01); *G06T 2207/20192* (2013.01); *G06T 2207/20201* (2013.01)

(58) Field of Classification Search
CPC ........... G06T 5/003; G06T 5/004; G06T 5/20; G06T 5/50; G06T 2207/20192; G06T 2207/20201
See application file for complete search history.

(56) References Cited

U.S. PATENT DOCUMENTS 9,042,672 B2 * 5/2015 Wang .................... G06T 5/003
382/255
2006/0279585 A1    12/2006 Milanfar et al.
(Continued)

FOREIGN PATENT DOCUMENTS

WO    WO2011139288 A1    11/2011
WO    WO2012060835 A1    5/2012
(Continued)

OTHER PUBLICATIONS

Lee et al. ("High-quality non-blind image deconvolution," 2010 Fourth Pacific-Rim Symposium on Image and Video Technology).*
(Continued)

*Primary Examiner* — Yubin Hung
(74) *Attorney, Agent, or Firm* — Roeder & Broder LLP; Steven G. Roeder

(57) ABSTRACT

A method for deblurring a blurry image (400) includes the steps of: performing a first phase of deconvolution (202) with a first phase regularization spatial mask (300) to reconstruct the main edges and generate a first phase latent sharp image (404) having reconstructed main edges; and performing a second phase of deconvolution (204) with a second phase regularization spatial mask (304) to reconstruct the texture and generate a second phase latent sharp image (406). The second phase regularization spatial mask (304) can be different from the first phase regularization spatial mask (300).

20 Claims, 11 Drawing Sheets

Related U.S. Application Data

(60) Provisional application No. 61/859,740, filed on Jul. 29, 2013.

(56) References Cited

U.S. PATENT DOCUMENTS

| | | | |
|---|---|---|---|
| 2007/0217713 A1* | 9/2007 | Milanfar | G06T 3/4053 |
| | | | 382/299 |
| 2008/0240607 A1 | 10/2008 | Sun et al. | |
| 2010/0166332 A1 | 7/2010 | Lee et al. | |
| 2011/0085741 A1* | 4/2011 | Zhang | G06T 5/003 |
| | | | 382/255 |
| 2011/0085743 A1 | 4/2011 | Lei et al. | |
| 2012/0269414 A1 | 10/2012 | Zha et al. | |
| 2013/0033608 A1 | 2/2013 | Hong | |
| 2013/0058587 A1 | 3/2013 | Wang et al. | |
| 2013/0169824 A1 | 7/2013 | Hong et al. | |
| 2014/0078320 A1 | 3/2014 | Hong | |
| 2014/0348441 A1 | 11/2014 | Tezaur | |
| 2014/0355901 A1 | 12/2014 | Tezaur | |
| 2015/0254814 A1 | 9/2015 | Ali et al. | |
| 2015/0294186 A1 | 10/2015 | Ali et al. | |

FOREIGN PATENT DOCUMENTS

| | | |
|---|---|---|
| WO | WO2013025220 A1 | 2/2013 |
| WO | WO2013148139 A1 | 10/2013 |
| WO | WO2013148142 A1 | 10/2013 |
| WO | WO2014074137 A1 | 5/2014 |
| WO | WO2014074138 A1 | 5/2014 |
| WO | WO2015017194 A1 | 2/2015 |

OTHER PUBLICATIONS

Liu et al. ("A robust denoising method for random-valued impulse noise based on smooth and texture region separation," International Conference on Systems and Informatics, May 19-20, 2012).*

Wan et al. ("Nonlocal regularization on weighted patches for image deconvolution," International Conference on Systems and Informatics, May 19-20, 2012).*

Hansen, et al., "Deblurring Images: Matrices, Spectra, and Filtering", SIAM 2006.

Wang, et al., "A New Alternating Minimization Algorithm for Total Variation Image Reconstruction", J. on Imaging Sciences 1, 248-272, SIAM 2008.

Sroubek, et al., "Robust Multichannel Blind Deconvolution via Fast Alternating Minimization", IEEE Transactions on Image Processing, 2012.

Wang, et al., "Analyzing Image Deblurring Through Three Paradigms", IEEE Transactions on Image Processing, pp. 115-129, 2012.

Whyte, et al., "Deblurring Shaken and Partially Saturated Images", ICCV 2011.

Lee, et al, "High-quality Non-blind Image Deconvolution with Adaptive Regularization", J. Vis. Communication, Image R., 2011.

Xu, et al., "Two-Phase Kernel Estimation for Robust Motion Deblurring", ECCV 2010.

Krishnan, et al., "Fast Image Deconvolution using Hyper-Laplacian Priors", Neural Information Processing Systems 2009.

Yang, et al., "An Efficient TVL1 Algorithm for Deblurring Multichannel Images Corrupted by Impulsive Noise", J. Sci. Comput. 31, 2842-2865, SIAM 2009.

Whyte, et al., "Non-uniform Deblurring for Shaken Images", In Proc. CVPR 2010.

Kumar, et al., "Real-Time Affine Global Motion Estimation Using Phase Correlation and Its Application for Digital Image Stabilization", Trans. on Image Processing, IEEE, Dec. 2011.

Hirsch, et al., "Fast Removal of Non-uniform Camera Shake", In Proc. IEEE, ICCV 2011.

International Search Report and Written Opinion of the International Searching Authority for PCT/US2014/47620, Nikon Corporation, dated Jul. 22, 2014 (related application).

Extended European Search Report for EP 14832716, Nikon Corporation, dated Mar. 8, 2017 (related application).

Qi Shan et al., "High-quality motion deblurring from a single image", ACM SIGGRAPH 2008 Papers On, SIGGRAPH '08, Aug. 2008 (Aug. 2008), pp. 1-10, XP055098743, New York, NY USA.

Hanyu Hong et al., "Single-image motion deblurring using adaptive anisotropic regularization", Optical Engineering, vol. 49, No. 9, 097008, Sep. 2010 (Sep. 2010), pp. 097008-1-097008-13. XP040514765, Spie, PO Box 10, Bellingham WA 98227-0010, USA.

Wan et al., "Nonfocal regularization on weighted patches for image deconvolution," International Conference on Systems and Informatics, May 19-20, 2012.

\* cited by examiner

MULTIPLE PHASE METHOD FOR IMAGE DECONVOLUTION

RELATED APPLICATION

This application is a divisional application of U.S. application Ser. No. 14/908,441 filed on Jan. 28, 2016 and entitled "MULTIPLE PHASE METHOD FOR IMAGE DECONVOLUTION". U.S. application Ser. No. 14/908,441 is a 371 of PCT/US14/47620 filed on Jul. 22, 2014. PCT/US14/47620 claims priority on U.S. Provisional Application Ser. No. 61/859,740, filed Jul. 29, 2013 and entitled "MULTIPLE PHASE METHOD FOR IMAGE DECONVOLUTION." As far as permitted, the contents of U.S. application Ser. No. 14/908,441; PCT/US14/47620; and U.S. Provisional Application Ser. No. 61/859,740 are incorporated herein by reference.

BACKGROUND

Cameras are commonly used to capture an image of a scene that includes one or more objects. Unfortunately, some of the images can be blurred. For example, movement of the camera and/or movement of the objects in the scene during the exposure time of the camera can cause the image to be blurred. Further, if the camera is not properly focused when the image is captured, the image can be blurred.

Deconvolution methods used for deblurring tend to be very complex and slow (with the exception of the most simple methods that produce very low quality images) and deblurred images tend to contain a lot of strong artifacts, most often in the form of ringing around edges in the image. Also, there is a tendency to strongly magnify noise. Techniques that help to reduce ringing artifacts and noise magnification in deconvolved images however tend to reduce any fine texture. Thus, the resulting images have an unnatural, posterized look, as many areas in these images appear unnaturally smooth and the textures are blurry and muddled.

When blur is sufficiently spatially uniform, a blurred captured image can be modeled as the convolution of a latent sharp image with some point spread function ("PSF") plus noise, $$B = K*L + N. \quad \text{Equation (1)}.$$

In Equation 1 and elsewhere in this document, (i) "B" represents a blurry image, (ii) "L" represents a latent sharp image, (iii) "K" represents a PSF kernel, and (iv) "N" represents noise (including quantization errors, compression artifacts, etc.).

A non-blind deconvolution problem seeks to recover the latent sharp image L only when the PSF kernel K is known. Alternatively, a blind deconvolution problem seeks to recover both the PSF kernel K and the latent sharp image L. Both the blind deconvolution problem and non-blind deconvolution problem are difficult to accurately solve because they are ill conditioned, and some information has been irretrievably lost due to zero and near zero values in the corresponding optical transfer function ("OTF"), Fourier transform of the PSF.

Moreover, many blurry images include areas that further complicate the problem of recovering a latent sharp image L. For example, extremely bright areas where the sensor pixels reach their saturation point in the blurry image B can adversely influence the determined PSF kernel K and the resulting latent sharp image L.

One common approach to solving a deconvolution problem includes reformulating it as an optimization problem in which suitable cost functions are minimized in order to find a solution to the deconvolution problem.

A relatively common type of a cost function used for deconvolution is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

An example of a generalization of a latent sharp image cost function is $$c(L) = \|K*L - B\|_p^p + \omega(\|(D_x*L)\|_q^q + \|(D_y*L)\|_q^q). \quad \text{Equation (2)}$$

In Equation (2), and in all other formulas in this document (i) the subscript p denotes the norm for the fidelity term, (ii) the superscript p denotes the power for the fidelity term, (iii) the subscript q denotes the norm for the regularization terms, (iv) the superscript q denotes the power for the regularization terms, and (v) $D_x$ and $D_y$ denote the convolution kernels used for computing derivatives in x- and y-direction, respectively. Equation 2 is a regularized least squares cost function when p is equal to two. The first term in Equation (2), $\|K*L-B\|_p^p$, is the fidelity term that forces the solution to satisfy blurring model in Equation (1) with a noise term that is small. Further, in Equation (2), $\|(D_x*L)\|_q^q$ and $\|(D_y*L)\|_q^q$ are regularization terms that help to infuse prior information about arrays that can be considered a latent sharp image. The derivatives of a natural image tend to be sparse: in most points derivatives are close to zero and only in relatively few points (edge points) the values are large. The regularization terms help to enforce this property. In Equation (2), ω is a regularization weight, a selected constant that helps to achieve the proper balance between the fidelity term and the regularization terms. It should be noted that this example represents a very simple cost function. Often, more complicated cost functions are used, such as those with more fidelity and regularization terms involving derivatives of $1^{st}$ or higher order.

When the image derivatives are assumed to follow a Guassian prior distribution, the power (superscript) and norm (subscript) for the regularization term(s) in the cost function is equal to two (q=2) (also referred to as a "Gaussian prior" or "2-norm"), and the cost function is often referred to as a Gaussian prior cost function. Unfortunately, the resulting latent sharp image from a Gaussian prior cost function often include strong ringing artifacts in the vicinity of high contrast edges.

In an attempt to improve the resulting latent sharp image, other powers and norms have been tried in the regularization term(s). For example, when image derivatives are assumed to follow a Laplacian prior distribution, the resulting regularization term in the cost function has a power and a norm that are equal to one (q=1) (also referred to as a "Laplacian prior" or a "1-norm"); and when image derivatives are assumed to follow a hyper-Laplacian prior distribution, the resulting regularization term in the cost function has a power and a norm that are equal to less than one (q<1) (also referred to as a "hyper-Laplacian prior" or "q-pseudo-norm"). With a Laplacian or hyper-Laplacian prior cost function, the ringing artifacts are reduced, but the fine texture in the image is often not recovered and the image does not look natural.

SUMMARY

The present invention is directed to a method for deblurring a blurry image with a known or estimated point spread function, the blurry image including main edges and texture. In one embodiment, the method includes the steps of: performing a first phase of deconvolution with a first phase regularization spatial mask to reconstruct the main edges and generate a first phase latent sharp image having reconstructed main edges; and performing a second phase of deconvolution with a second phase regularization spatial mask to reconstruct the texture and generate a second phase latent sharp image, the second phase regularization spatial mask being different from the first phase regularization spatial mask. As provided herein, the proposed multiple phase approach provided herein produces high quality deblurred images.

In one embodiment, the second phase regularization spatial mask is generated using the first phase latent sharp image. Further, as provided herein, (i) the first phase of regularization can include a first phase algorithm that assumes a Laplacian or Hyper-Laplacian prior and includes the first phase regularization spatial mask to suppress ringing artifacts and noise, and (ii) the second phase of regularization can include a second phase algorithm that assumes a Gaussian prior, and includes a spatial prior, and the second phase regularization spatial mask to help to recover image texture without introducing strong ringing artifacts.

As used herein, an assumption of a Laplacian prior shall mean a power of one (q=1) in regularization term(s), an assumption of a hyper-Laplacian prior shall mean a power of less than one (q<1) in regularization term(s), and an assumption of a Gaussian prior shall mean a power that is equal to two (q=2).

Additionally, the method can include the steps of (i) identifying any outlier regions in the blurry image, and (ii) creating a fidelity term mask based on the identified outlier regions. Further, the first phase algorithm can use the fidelity term mask, and the second phase algorithm can use the fidelity term mask.

Moreover, the method can include the steps of (i) performing a third phase of deconvolution on the blurry image with a third phase regularization spatial mask to reconstruct the main edges to generate a third phase latent sharp image; and (ii) performing a fourth phase of deconvolution with a fourth phase regularization spatial mask to reconstruct the texture to generate a fourth phase latent sharp image, the fourth phase regularization spatial mask being different from the third phase regularization spatial mask. In this embodiment, the method can include the step of merging the second phase latent sharp image with the fourth phase latent sharp image to create the output latent sharp image.

Further, the method can include the steps of (i) converting the blurry image to a color space that includes a luminance channel and chrominance channels, (ii) performing deconvolution of the luminance channel of the blurry image with the first phase and the second phase of deconvolution, (iii) generating the second phase regularization spatial mask using the deblurred luminance channel, and (iv) performing deconvolution of the chrominance channels of the blurry image with the first phase and the second phase of deconvolution.

In another embodiment, the method includes the steps of: (i) performing a first phase of deconvolution with a first latent sharp image cost function that assumes a Laplacian or Hyper-Laplacian prior regularization to generate a first phase latent sharp image having reconstructed main edges; and (ii) performing a second phase of deconvolution with a second latent sharp image cost function that assumes a Gaussian prior regularization and a spatial prior regularization to generate a second phase latent sharp image with reconstructed texture.

In still another embodiment, the present invention is directed to a system for deblurring a blurry image that includes a control system that (i) performs a first phase of deconvolution with a first phase regularization spatial mask to reconstruct the main edges and generate a first phase latent sharp image having reconstructed main edges; and (ii) performs a second phase of deconvolution with a second phase regularization spatial mask to reconstruct the texture and generate a second phase latent sharp image, the second phase regularization spatial mask being different from the first phase regularization spatial mask.

In yet another embodiment, the present invention, the control system (i) performs a first phase of deconvolution with a first latent sharp image cost function that assumes a Laplacian or Hyper-Laplacian prior regularization to generate a first phase latent sharp image having reconstructed main edges; and (ii) performs a second phase of deconvolution with a second latent sharp image cost function that assumes a Gaussian prior regularization and a spatial prior regularization to generate a second phase latent sharp image with reconstructed texture.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is a simplified illustration of a portion of a Subphase 1A regularization spatial mask $N_1$ having features of the present invention;

FIG. 3B is a simplified illustration of a portion of a Subphase 1B regularization spatial mask $N_1$ having features of the present invention;

FIG. 3C is a simplified illustration of a portion of a Phase 2 regularization spatial mask $N_2$ having features of the present invention;

DESCRIPTION

Figure 1:
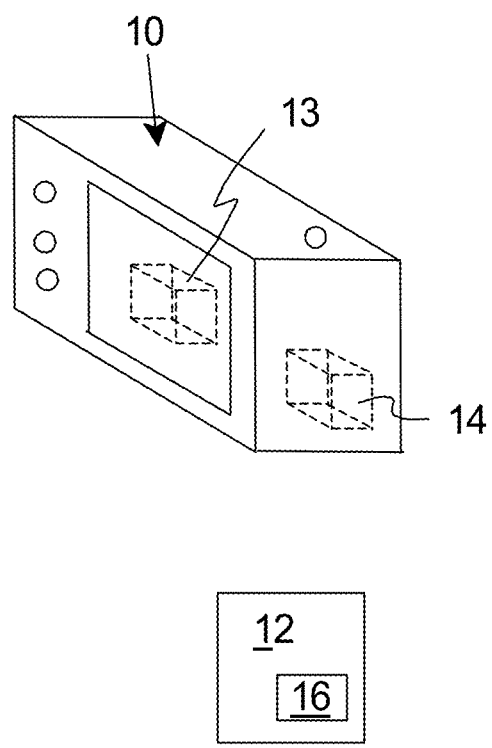
FIG. 1 is a simplified view of a camera and a computer having features of the present invention.

FIG. 1 is a simplified perspective view of an image apparatus 10 (e.g. a digital camera), and a computer 12 (illustrated as a box). It should be noted that the image apparatus 10 and/or the computer 12 can be referred to as a system. As is known, movement of the image apparatus 10, and/or movement of an object (not shown in FIG. 1) in the scene (not shown) during the capturing of an image (not shown in FIG. 1) can cause image blur. Additionally, or in the alternative, blur in the image can be caused by other things, such as, the image apparatus 10 not being properly focused when the image is captured.

As an overview, in certain embodiments, the present invention is directed to a number of multiple phase algorithms for estimating the latent sharp image of a blurred image and deconvoluting a blurred image. Stated in another fashion, the present invention is directed to one or more, multiple phase, non-blind image deconvolution methods that efficiently suppress ringing artifacts and noise, and recover image texture. In certain embodiments, the proposed methods significantly improve the quality of deblurred images by using one or more of the following features (i) multiple phases of deconvolution with different adaptive regularization (L1 Laplace or Hyper-Laplace) prior regularization and combined L2 Gaussian and spatial prior regularization; (ii) separate deconvolution of highlight and non-highlight regions by using spatial mask in fidelity term; and/or (iii) separate deconvolution of luminance and chrominance channels with deblurred luminance channel being used to produce adaptive regularization masks for chrominance channels. As a result thereof, the proposed multiple phase approaches provided herein produce high quality deblurred images.

In one embodiment, as provided herein, the image apparatus 10 can include a capturing system 13 that captures the image, and a control system 14 that uses one or more of the algorithms for deconvoluting the blurred image for in camera processing. Alternatively, the computer 12 can include a control system 16 that uses one or more of the algorithms for deconvoluting the blurred image. In either event, the control system 14, 16 provides a deblurred latent sharp image from the blurred image. Each control system 14, 16 can include one or more processors and circuits. Further, either of the control systems 14, 16 can include software that utilizes one or more methods (performs the algorithms) provided herein to deblur the blurry image.

The methods provided herein help to significantly improve the quality of deblurred images. The resulting deblurred images contain relatively few ringing artifacts and noise, and more fine texture. Further, in certain embodiments, more difficult images can be handled successfully because color ringing artifacts and heavy ringing artifacts around clipped highlight regions are significantly reduced.

Figure 2:
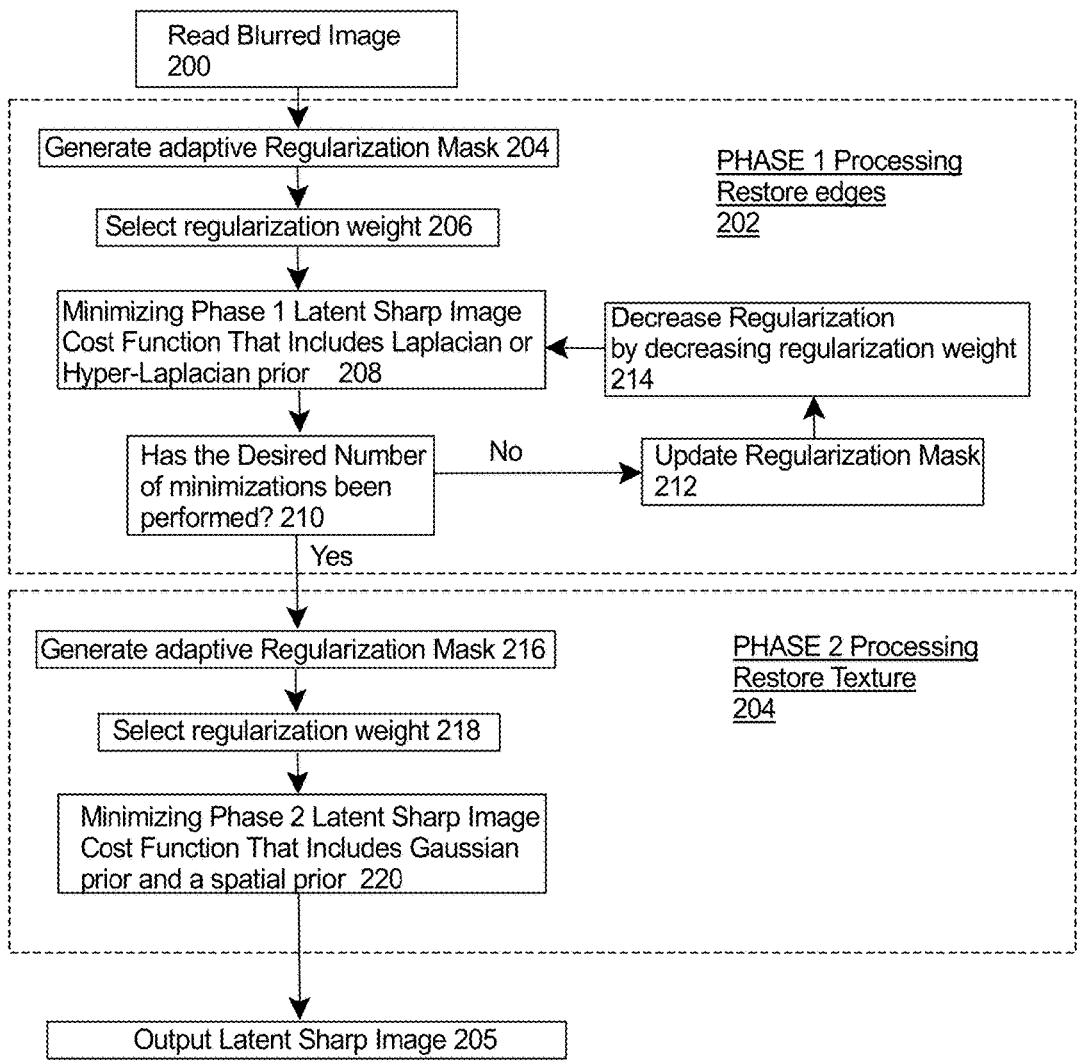
FIG. 2 illustrates a first embodiment of a multi-phase image deconvolution method having features of the present invention.

FIG. 2 illustrates a first embodiment of a multi-phase image deconvolution method. In one embodiment, the multi-phase image deconvolution method can be used for non-blind deconvolution with a known or estimated point spread function. It should be noted that the order of some of the steps in FIG. 2 can be switched, performed concurrently, and/or some of the steps can be optional. In this embodiment, the multi-phase image deconvolution method is presented as a two phase method. At block 200, the blurred image is read by the algorithm. Subsequently, Phase 1 processing of the blurred image is performed at block 202 to restore and reconstruct the main edges with a strong emphasis on suppressing ringing. Next, Phase 2 processing is performed at block 204 to restore texture. Upon completion of Phase 2 processing, the output Latent Sharp Image is provided at block 205. As provided herein, because of the two phase method, the resulting deblurred image contains relatively few ringing artifacts and noise, and more fine texture.

Referring to FIG. 2, at block 204, an adaptive phase 1 regularization mask $N_1$ is generated, and at block 206, a phase 1 regularization weight $\omega_1$ is selected. The adaptive regularization mask $N_1$ can be coarse and can be computed from the blurry image. The regularization weight $\omega_1$ is selected to achieve the desired amount of regularization. Non-exclusive examples of a suitable regularization weight $\omega_1$ are approximately 1e-1, 1e-2, 1e-3, or 1e-4, the value of which will depend on the accuracy of the PSFs and other factors. Subsequently, at block 208, a phase 1 latent sharp image cost function is minimized. As provided herein, in certain embodiments, the phase 1 latent sharp image cost function uses a Laplacian prior or a Hyper-Laplacian prior, and the phase 1 adaptive regularization mask $N_1$.

As provided herein, the phase 1 latent sharp image cost function can be minimized multiple times, with each subsequent minimization being performed with an improved regularization mask $N_1$ and decreased regularization (smaller regularization weight $\omega_1$). For ease of discussion, the first minimization of the phase 1 latent sharp image cost function can be referred to as Subphase 1A processing, and the second minimization of the phase 1 latent sharp image cost function can be referred to as Subphase 1B processing.

In certain instances, Subphase 1A and Subphase 1B processing is all that is necessary to accurately reconstruct the main edges. Alternatively, if additional processing is desired to better restore the edges, a third minimization of the phase 1 latent sharp image cost function can be referred to as Subphase 1C processing, and subsequent minimizations can be referred to as Subphase 1D, 1E, etc.

Typically, during Subphase 1A, the phase 1 cost function can be minimized by variable splitting and alternating minimization in approximately 6-10 iterations. During Subphase 1A processing, there is a coarse restoration of image with the strong emphasis on suppressing ringing, and the Subphase 1A latent sharp image is slightly blurry image with very little ringing.

After Subphase 1A processing is complete, at block 210 the number of minimizations is evaluated to determine if the desired number of minimizations has been performed. If the desired number of minimizations is two, then the answer is no and Subphase 1B processing begins. In Subphase 1B processing, at block 212, the phase 1 regularization mask $N_1$ is updated and improved, and at block 214, the regularization is decreased by decreasing the phase 1 regularization weight $\omega_1$. For example, in Subphase 1B, the phase 1 regularization mask $N_1$ can be computed from both the blurry image and the Phase 1A latent sharp image. Further, as a non-exclusive example, the phase 1 regularization weight $\omega_1$ can be approximately one, two, five, seven, or ten times less for each subsequent Subphase.

Next, at block 208, the phase 1 latent sharp image cost function is again minimized with the improved mask $N_1$ and decreased regularization. Typically, during Subphase 1B, the phase 1 cost function can be minimized by variable splitting and alternating minimization in approximately 6-10 iterations. After Subphase 1B processing, there is more accurate restoration of the image with strong emphasis on suppressing ringing. Typically, the Subphase 1B algorithm produces a Subphase 1B Latent sharp image with sharp main edges and very little ringing, but (in certain images) without fine texture due to strong ringing suppression by the Laplacian or Hyper-Laplacian prior.

After Subphase 1B processing, at block 210 the number of minimizations is evaluated to determine if the desired number of minimizations has been performed? If the desired number of minimizations is two, then the answer is yes, Phase 1 processing is complete, the Phase 1B latent sharp image is the Phase 1 latent sharp image, and Phase 2 processing begins. Alternatively, if the desired number is three or more, Subphase 1C processing is performed with an updated phase 1 regularization mask $N_1$, and a further decreased phase 1 regularization weight $\omega_1$. This loop can be repeated until the desired the level of edge restoration has occurred.

Phase 2 processing begins at block 216 where an adaptive phase 2 regularization mask $N_2$ is generated, and at block 218 where a phase 2 regularization weight $\omega_2$ is selected to achieve the desired level of regularization. For example, in Phase 2, the phase 2 regularization mask $N_2$ can be computed from both the blurry image and the final result of Phase 1 processing (the Phase 1 latent sharp image). Subsequently, at block 220, a phase 2 latent sharp image cost function is minimized. As provided herein, in certain embodiments, the phase 2 latent sharp image cost function can use the phase 2 regularization mask $N_2$, a Gaussian prior to recover and restore image texture, and a spatial prior to inhibit the introduction of strong ringing artifacts. The Phase 2 cost function can be minimized by variable splitting and alternating minimization (typically within approximately 3 iterations, for example).

After finishing the minimization of the Phase 2 cost function, the resulting latent sharp image is output at block 205. Alternatively, the minimization of the Phase 2 cost function can be repeated one or more times (somewhat similar to Phase 1) with each subsequent process using an improved phase 2 regularization mask $N_2$.

With the present invention, (i) in Phase 1, the algorithm deconvolutes the blurry image while efficiently suppressing ringing artifacts and noise, and (ii) in Phase 2, the algorithm recovers the image texture. With this design, the multiple stage algorithm can produce deblurred images that are almost free of ringing, contain very little noise, and also contain natural texture. Further, in certain embodiments, the method is very fast because variable splitting and alternating minimization can be used to minimize the cost functions.

It should be noted that the two phase algorithm described above can also be described as a three phase algorithm where Subphase 1A and Subphase 1B (which both use a Laplacian or Hyper-Laplacian prior) are considered two separate phases.

As one non-exclusive example, the Phase 1 latent sharp image cost function (used for Subphase 1A, 1B, etc., processing) can have the following form for non-blind deconvolution:

$$c(L)=\alpha_1\|K*L-B\|_p^p+\alpha_2(\|K*D_x*L-D_x*B\|_p^p+\|K*D_y*L-D_y*B\|_p^p)+\omega_1(\|N_1(D_x*L)\|_q^q+\|N_1(D_y*L)\|_q^q).$$ Equation (3).

In Equation 3, and elsewhere in this document, (i) $c(L)$ is the latent sharp image estimation cost function, (ii) L is the latent sharp image, (iii) K is the PSF kernel, (iv) B is the blurry image, (v) $D_x$ and $D_y$ are the first order partial derivative operators, (vi) alpha one "$\alpha_1$" is a first fidelity weight parameter, and alpha two "$\alpha_2$" is a second fidelity weight parameter that help to set the proper balance between the fidelity terms to achieve the best compromise between the fidelity terms; (vii) $\omega_1$ is the first regularization weight for the smooth areas; (viii) the subscript p denotes the norm for the fidelity term(s) and the superscript p denotes the power for the fidelity term(s); (ix) the subscript q denotes the norm for the regularization term(s) and the superscript q denotes the power for the regularization term(s); and (x) $N_1$ is the first phase regularization spatial mask for Phase 1 processing. As provided herein, in Phase 1 processing, q is equal to one (q=1) if a Laplacian prior is assumed, or q is less than one (q<1) if a hyper-Laplacian prior is assumed.

For Equation 3, other fidelity term(s) are possible. For example, it is possible to use just one fidelity term ($\alpha_2$=0). However, in certain embodiments, including fidelity terms with $1^{st}$ order derivatives and putting more weight on them (second fidelity weight parameter greater than the first fidelity weight parameter ($\alpha_2$>>$\alpha_1$)) yields better results. In certain embodiments, the fidelity term without derivatives must be present ($\alpha_1$>0) because all the regularization terms include derivatives and there would be zeros in the denominator of the closed form formula used for updating L otherwise. In one, non-exclusive embodiment, the first fidelity weight parameter $\alpha_1$ can be set to be equal to 0.001 ($\alpha_1$=0.001), and (ii) the second fidelity weight parameter $\alpha_2$ can set to be equal to one ($\alpha_2$=1). However, other values can be used. With this design, the cost function of Equation (3) relies mainly on fidelity terms with derivatives. Using one or more fidelity terms with image derivatives help to reduce ringing.

Equation (3) can be re-written with the power and norm for the fidelity term(s) equal to two (p=2), and for the assumption of a Laplacian prior (q=1) as follows:

$$c(L)=\alpha_1\|K*L-B\|_2^2+\alpha_2(\|K*D_x*L-D_x*B\|_2^2+\|K*D_y*L-D_y*B\|_2^2)+\omega_1(\|N_1(D_x*L)\|_1^1+\|N_1(D_y*L)\|_1^1.$$ Equation (4).

In one, non-exclusive embodiment, Equation (4) can be minimized by variable splitting and alternating minimization. In certain cases, approximately six to ten iterations may be needed to suppress ringing. In certain embodiments, to minimize the cost function of Equation (4), the following function with auxiliary variables $W_x$ and $W_y$ can be created:

$$c(L,W_x,W_y)=\alpha_1\|K*L-B\|_2^2+\alpha_2(\|K*D_x*L-D_x*B\|_2^2+\|K*D_y*L-D_y*B\|_2^2)+\omega_1(\|N_1W_x\|_1^1+\|N_1W_y\|_1^1+\beta(\|W_x-D_x*L\|_2^2+\|W_y-D_y*L\|_2^2)).$$ Equation (5).

In Equation (5), (i) auxiliary array $W_x$ has replaced partial derivative $D_x*L$ and auxiliary array $W_y$ has replaced partial derivative $D_y*L$ in the regularization terms; (ii) there are two penalty terms, $\|W_x-D_x*L\|_2^2$ and $\|W_y-D_y*L)\|_2^2$ which force $W_x \approx D_x*L$ and $W_y \approx D_y*L$; and (iii) $\beta$ is a penalty weight that has been added to help balance the influence of the penalty terms. Equation (5) can be minimized iteratively, by alternating minimization over $W_x$, $W_y$, and L, respectively. In all three cases, a closed form formula for the minimum exists that can be easily evaluated. In certain embodiments, it is common to increase the penalty weight β during iterating minimization over $W_x$, $W_y$, and L in alternating fashion. In one, non-exclusive embodiment, the penalty weight of β=1 can be used in a first iteration, and the penalty weight β can increased by a factor (e.g. a factor of 2 in one non-exclusive example) in each subsequent iteration.

The following minimization formulas can be used for $W_x$ and $W_y$, $$W_x = sthr\left(D_x * L, \frac{N}{2\beta}\right), \quad \text{Equation (6)}$$

$$W_y = sthr\left(D_y * L, \frac{N}{2\beta}\right), \quad \text{Equation (7)}$$

$$sthr(x; y) = \text{sign}(x) \max(0, |x| - y). \quad \text{Equation (8)}$$

In Equation (8), sthr is the soft thresholding function (applied to each element of the array).

As provided herein, the closed form formula for the minimum of the latent sharp image cost function of Equation (5) is as follows:

$$F(L) = \frac{(\alpha 1 + \alpha 2 D)\overline{F(K)}F(B) + \omega_1 \beta(\overline{F(D_x)}F(W_x) + \overline{F(D_y)}F(W_y))}{(\alpha 1 + \alpha 2 D)\overline{F(K)}F(K) + \omega_1 \beta D}. \quad \text{Equation (9)}$$

In Equation (9), F is the Fourier transform operator, and D has the following value:

$$D = \overline{F(D_x)}F(D_x) + \overline{F(D_y)}F(D_y) \quad \text{Equation (10)}.$$

The regularization spatial mask $N_1$ for Phase 1 (and $N_2$ for Phase 2) is an array of individual weights for individual pixels in the regularization term(s) that can be used to suppress noise and ringing. As a non-exclusive example, the pixels in the regularization spatial mask can have any value between 0 and 1. Alternatively, the regularization spatial mask can be a binary mask in which the pixels have a value of either 0 and 1. Multiplication by the mask is point-wise.

There is a number of possible ways of creating the regularization spatial masks. In one non-exclusive example, the estimation of the regularization spatial mask $N_1$ in Phase 1 is performed at least twice, (i) first (for Subphase 1A processing) with a coarse mask computed from the blurry original image, and (ii) second (for Subphase 1B processing) with a finer mask that is computed using the latent sharp image L obtained after Subphase 1A processing, as well as the blurry image B.

For example, for Subphase 1A processing, the regularization spatial mask $N_1$ can have higher weights for the pixels in the smooth regions in the original blurry image, and lower weights for the pixels in edge regions of the original blurry image. For example, a high pass filter can be used on the original blurry image to identity the pixels in the smooth regions and the pixels in the edge regions. FIG. 3A is a simplified illustration of a portion of a Subphase 1A regularization spatial mask $N_1$ 300 that has different values for the pixels.

Further, for Subphase 1B processing, the regularization spatial mask $N_1$ can be computed using both the blurry image and the latent sharp image L obtained from Subphase 1A processing. In one embodiment, the regularization spatial mask $N_1$ for Subphase 1B processing will have higher weights for the pixels in the smooth regions, and lower weights for the pixels in edge regions. For example, a high pass filter can be used on both the original blurry image and the latent sharp image L obtained from Subphase 1A processing to identity the pixels in the smooth regions and the pixels in the edge regions. Thus, the regularization spatial mask $N_1$ used in the Subphase 1B processing will be more accurate than the regularization spatial mask $N_1$ used in the Subphase 1A processing. FIG. 3B is a simplified illustration of a portion of a Subphase 1B regularization spatial mask $N_1$ 302 that has different values for the pixels.

In certain embodiments, the Subphase 1B cost function is the same as the Subphase 1A cost function (e.g. Equation 3), except weaker regularization is used (smaller value of regularization weight $\omega_1$) and the improved First Phase spatial mask $N_1$. As a non-exclusive example, with the weaker regularization of Subphase 1B, the value of the regularization weight $\omega_1$ can be approximately five, ten, fifteen, or twenty times weaker than the corresponding value in Phase 1A.

Additionally, as provided above, Phase 1 can include a Subphase 1C processing (or more processing, e.g. Subphase 1D, Subphase 1E, etc) with the same cost function (e.g. Equation 3), with each successive Subphase processing including weaker regularization (smaller values of regularization weight $\omega_1$) and/or an improved regularization mask $N_1$ based on the latent sharp image from the previous processing step.

Phase 1 produces images that are relatively clean, free of ringing and noise, but they lack texture. In contrast, Phase 2 concentrates on recovering the texture. To do that, in certain embodiments, the Phase 2 algorithm (i) assumes a Gaussian prior (q=2) that does not suppress texture as much as a Laplacian or hyper-Laplacian prior, (ii) a phase 2 regularization spatial mask $N_2$ in the Gaussian prior regularization term, and (iii) a second prior based on the result of Phase 1 to suppress ringing. One, non-exclusive example of a suitable Phase 2 latent sharp image cost function has the following form:

$$c(L) = \alpha_1 \|K*L - B\|_2^2 + \alpha_2(\|K*D_x*L - D_x*B\|_2^2 + \|K*D_y*L - D_y*B\|_2^2) + \omega_2(\|N_2(D_x*L)\|_2^2 + \|N_2(D_y*L)\|_2^2) + \sigma \|L - L_{Phase1}\|_2^2. \quad \text{Equation (11)}$$

In Equation (11), (i) $\omega_2$ is the phase 2 regularization weight for the smooth areas; (ii) $N_2$ is the phase 2 regularization spatial mask for Phase 2 processing; (iii) $L_{Phase1}$ denotes the latent sharp image estimated at the end of Phase 1 processing (e.g. output of Subphase 1B); (iv) $\|L - L_{Phase1}\|_2^2$ is a spatial prior; and (v) σ is a regularization weight for the spatial prior to provide proper weight for the spatial prior. In Equation (11), (i) the square is used in the power and norm (q=2) of Regularization term(s) of the formula because the assumption of a Gaussian prior is better for restoring texture; and (ii) the spatial prior is used to suppress ringing and noise.

For Phase 2 processing, a variable splitting technique can be used for splitting and alternating minimization of the cost function of Equation (11) in an efficient manner. In this example, even though the Gaussian prior is assumed, the spatial masks $N_2$ in the regularization terms make it impossible to derive a closed form formula for the minimum. The new cost function for Phase 2 derived from Equation (11) can have the following form:

$$c(L,W_x,W_y)=\alpha_1\|K*L-B\|_2^2+\alpha_2(\|K*D_x*L-D_x*B\|_2^2+\|K*D_y*L-D_y*B\|_2^2)+\omega_2(\|N_2W_x\|_2^2+N_2W_y\|_2^2+\beta(\|W_x-D_x*L\|_2^2+\|W_y-D_y*L\|_2^2))+\sigma\|L-L_{Phase1}\|_2^2 \quad \text{Equation (12)}.$$

In Equation (12), in one, non-exclusive embodiment, the penalty weight of β=1 can be used in a first iteration, and the penalty weight β can be increased by a factor (e.g. a factor of 2 in one non-exclusive example) in each subsequent iteration. As a non-exclusive example, a suitable regularization weight σ can be between approximately 1e-2 and 1e-3. However, other values for β and σ can be used.

The cost function of Equation (12) can be minimized by variable splitting and alternating minimization over L, $W_x$ and $W_y$. In many cases, not many iterations seem to be needed. The formulas for updating L, $W_x$, and $W_y$, and the cost function can be expressed after splitting as follows:

$$W_x = \frac{D_x*L}{1+\frac{1}{\beta}(N2)^2}, \quad \text{Equation (13)}$$

$$W_y = \frac{D_y*L}{1+\frac{1}{\beta}(N2)^2}, \quad \text{Equation (14)}$$

As provided herein, there is a closed form formula for the minimum of the latent sharp image cost function of Equation (12) as follows:

$$F(L) = \frac{(\alpha1+\alpha2D)\overline{F(K)}F(B)+\sigma F(L_{Phase1})+\omega_2\beta(\overline{F(D_x)}F(W_x)+\overline{F(D_y)}F(W_y))}{(\alpha1+\alpha2D)\overline{F(K)}F(K)+\omega_2\beta D}, \quad \text{Equation (15)}$$

where D is the same as provided above in Equation (10).

In Phase 2, the regularization spatial mask $N_2$ can again be used to suppress noise and ringing and can be computed from both the blurry image and the latent sharp image estimated at the end of Phase 1 processing (e.g. end of Subphase 1B). In one embodiment, the regularization spatial mask $N_2$ will have higher weights for the pixels in the smooth regions, and lower weights for the pixels in edge regions. For example, a high pass filter can be used on both the original blurry image and the result of Phase 1 processing to identity the pixels in the smooth regions and the pixels in the edge regions. The spatial mask $N_2$ used in the Phase 2 processing should be more accurate than the final spatial mask $N_1$ used in the Phase 1 processing. FIG. 3C is a simplified illustration of a portion of a Phase 2 regularization spatial mask $N_2$ 304 that illustrates different values for different pixels.

Figure 4A:
FIG. 4A is an illustration of a blurry image.
Figure 4B:
FIG. 4B is an illustration of a latent sharp image after Subphase 1A processing of the blurry image of FIG. 4A.
Figure 4C:
FIG. 4C is an illustration of a latent sharp image after Subphase 1B processing of the blurry image of FIG. 4A.
Figure 4D:
FIG. 4D is an illustration of a final latent sharp image after Phase 2 processing of the blurry image of FIG. 4A.

FIG. 4A is an illustration of a blurry image 400. FIG. 4B is an illustration of a latent sharp image 402 after Subphase 1A processing of the blurry image 400 of FIG. 4A. After Subphase 1A processing, there is a coarse restoration of image with the strong emphasis on suppressing ringing, and the Subphase 1A latent sharp image 402 is slightly blurry image with very little ringing. FIG. 4C is an illustration of a latent sharp image 404 after Subphase 1B processing of the blurry image 400 of FIG. 4A. The Subphase 1B processing produces a latent sharp image 404 with very little ringing or noise, but the image lacks fine texture (looks posterized). FIG. 4D is an illustration of a final latent sharp image 406 after Phase 2 processing of the blurry image 400 of FIG. 4A. The latent sharp image 406 produced after Phase 2 processing restores texture to achieve a more natural looking restored image. Thus, as provided herein, the multiple phase algorithm helps to obtain high quality deblurred images that are almost free of ringing artifacts and noise, yet they do include fine texture.

Figure 4E:
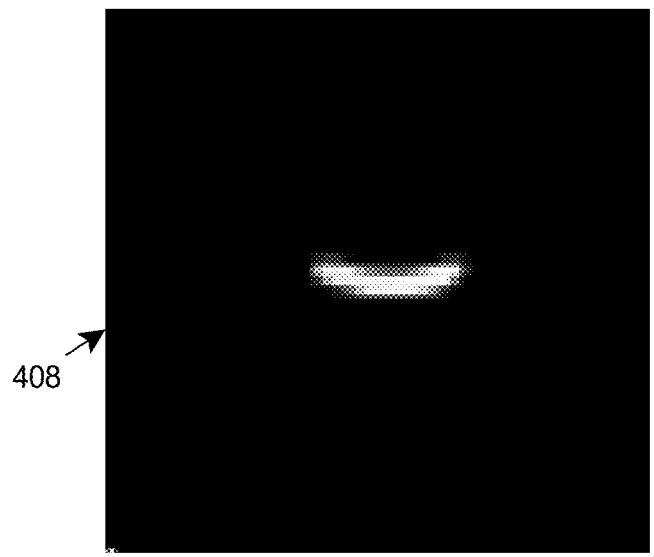
FIG. 4E is an illustration of a true PSF of the blurry image of FIG. 4A.

FIG. 4E is an illustration of a true PSF 408 of the blurry image 400 of FIG. 4A. The true PSF 408 is only known if an experiment is set up and the blurry image 400 is artificially blurred with the true PSF 408.

Figure 4F:
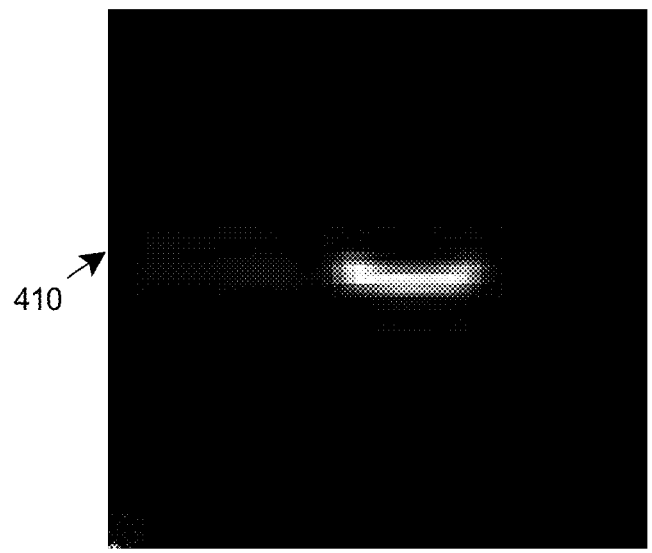
FIG. 4F is an illustration of an estimated PSF of the blurry image of FIG. 4A.

FIG. 4F is an illustration of an estimated PSF 410 of the blurry image 400 of FIG. 4A. The estimated PSF 410 can be estimated using a blind deconvolution algorithm. Subsequently, the PSF 410 can be used in one of the non-blind deconvolution methods provided herein to obtain the entire final latent sharp image.

It should be noted that the Phase 1 and Phase 2 cost functions provided above are non-exclusive examples, and that significant modifications are possible for the Phase 1 and Phase 2 cost functions. For example, the Phase 1 and Phase 2 cost functions can be modified to (i) assume Laplacian norm in the Fidelity term(s) (p=1); (ii) assume a hyper-Laplacian (pseudo-norm) in the Fidelity term(s) (p<1); and/or (iii) use a spatial mask in the fidelity term(s). Such cost functions can be minimized using variable splitting algorithm similar to that provided above. Another non-exclusive example of a variable splitting technique that can be used is described in the paper by Šroubek and Milanfar (F. Šroubek, P. Milanfar: *Robust Multichannel Blind Deconvolution via Fast Alternating Minimization*, IEEE Trans Im. Proc., 2012), the contents of which are incorporated herein by reference, as far as permitted.

As provided herein, the Phase 1 latent sharp image cost function and the Phase 2 latent sharp image cost function can be expressed more generally than provided above. For example, the Phase 1 cost function of Equation (3) can be expressed more generally as follows:

$$c(L)=\text{Fidelity Term(s)}+\omega_1(\|N_1(D_x*L)\|_q^q+\|N_1(D_y*L)\|_q^q). \quad \text{Equation (16)}.$$

Alternatively, the regularization term for the cost function of Equation 16 can be expressed for a 1-norm gradient to be "$\|N_1|\text{grad } L|\|_1^1$."

Further, the Phase 2 cost function of Equation (11) can be expressed more generally as follows:

$$c(L)=\text{Fidelity Terms(s)}+\omega_2(\|N_2(D_x*L)\|_2^2+\|N_2(D_y*L)\|_2^2)+\sigma\|L-L_{Phase1}\|_2^2 \quad \text{Equation (17)}.$$

The exact fidelity term(s) utilized in Equations (16) and (17) can vary. In one embodiment, the fidelity term(s) can be expressed as follows:

$$\text{FidelityTerm(s)}=\alpha_0\|L_j*K-B_j\|_2^2+\alpha_1\|D_x*L_j*K-D_x*B_j\|_2^2+\alpha_2\|D_y*L_j*K-D_y*B_j\|_2^2+\alpha_{11}\|D_{xx}*L_j*K-D_{xx}*B_j\|_2^2+\alpha_{12}\|D_{xy}*L_j*K-D_{xy}*B_j\|_2^2+\alpha_{22}\|D_{yy}*L_j*K-D_{yy}*B_j\|_2^2 \quad \text{Equation (18)}.$$

In Equation (18), $\alpha_0$, $\alpha_1$, $\alpha_2$, $\alpha_{11}$, $\alpha_{12}$, and $\alpha_{22}$ are fidelity term weights. It should be noted that the fidelity term weights can be chosen to be zero ("0") or another weight. As a result thereof, in Equation (18), this cost function covers cases both with and without derivatives. It should also be noted that the cost functions in Equations (16) and (17) can be minimized using variable splitting algorithm similar to that provided above. For example, the formulas can be pretty much the same as above Equations (6, 7, 9 and 13, 14, 15), except the term $\alpha_1+\alpha_2 D$ would be replaced everywhere by $\alpha_0+\alpha_1 \text{ conj}(F(D_x))F(D_x)+\alpha_2 \text{ conj}(F(D_y))F(D_y)+\alpha_{11} \text{ conj}(F(D_{xx}))F(D_{xx})+\alpha_{12} \text{ conj}(F(D_{xy}))F(D_{xy})+\alpha_{22} \text{ conj}(F(D_{yy}))F(D_{yy})$.

Deconvolution is very sensitive to any departures from a linear blurring model. Real-life images often contain highlights that have been clipped due to sensor saturation. Clipping is strongly non-linear and violates a traditional linear blurring model. The highlights have high contrast edges that tend to cause heavy ringing artifacts in deblurred images. The multiple phase algorithm described above does not have the capability to deal with burnt out highlights or other outliers. However, as provided herein, in certain embodiments of the present invention, a fidelity term spatial mask M can be added to one or more of the fidelity term(s) of the Phase 1 and Phase 2 cost functions to allow for special treatment of the outliers.

As provided herein, the Phase 1 cost function of Equation 16 can be rewritten to include a fidelity term spatial mask M as follows:

$$c(L) = \alpha_1 \|M(K*L-B)\|_p^p + \alpha_2(\|M(K*D_x*L-D_x*B)\|_p^p + \|M(K*D_y*L-D_y*B)\|_p^p) + \omega_1(\|N_1(D_x*L)\|_q^q + \|N_1(D_y*L)\|_q^q)$$

Equation (19)

Further, the Phase 2 cost function of Equation 17 can be rewritten to include a fidelity term spatial mask M as follows:

$$c(L) = \alpha_1 \|M(K*L-B)\|_p^p + \alpha_2(\|M(K*D_x*L-D_x*B)\|_p^p + \|M(K*D_y*L-D_y*B)\|_p^p) + \omega_2(\|N_2(D_x*L)\|_q^q + \|N_2(D_y*L)\|_q^q) + \sigma_1\|L-L_{Phase1}\|_q^q + \sigma_2(\|D_x*L-D_x*L_{Phase1}\|_q^q + \|D_y*L-D_y*L_{Phase1}\|_q^q).$$

Equation (20)

In Equations 19 and 20, M is an adaptive fidelity spatial mask that allows for special treatment of certain pixels, e.g. outliers. For example, the fidelity spatial mask M can be used to limit the areas of the image that are being processed to the regions that do not include clipped highlights (e.g. limit processing to the areas far enough from outliers). With this design, the highlight regions can be deblurred separately, and with different parameters from the regions that do not include clipped highlights.

Figures 5A, 5B:
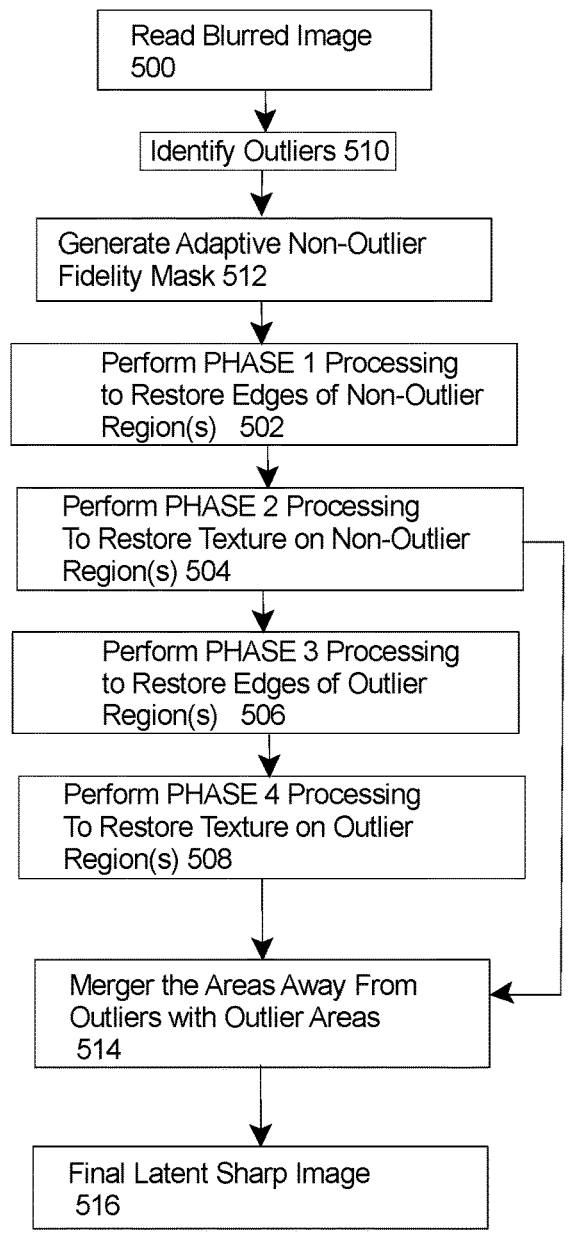
FIG. 5A illustrates another multi-phase image deconvolution method having features of the present invention.
FIG. 5B is a simplified illustration of a portion of a fidelity spatial mask M having features of the present invention.

FIG. 5A illustrates a multi-phase image deconvolution method with the capability to deal with burnt out highlights or other outliers in a blurred image 500. It should be noted that the order of some of the steps in FIG. 5A can be switched, performed concurrently, and/or some of the steps can be optional. In this embodiment, the multi-phase image deconvolution method can be considered a four phase non-blind image deconvolution method that includes special processing for outliers (e.g. highlights).

More specifically, in this embodiment, the four phase non-blind image deconvolution method can be divided into (i) Phase 1 processing 502; (i) Phase 2 processing 504; (iii) Phase 3 processing 506; and (iv) Phase 4 processing 508. In this embodiment, (i) Phase 1 processing 502 is similar to Phase 1 processing 202 described above and illustrated in FIG. 2, except the Phase 1 cost function includes a fidelity spatial mask M; (ii) Phase 2 processing 504 is similar to Phase 2 processing 204 described above and illustrated in FIG. 2, except the Phase 2 cost function includes a fidelity spatial mask M; (iii) Phase 3 processing 506 is similar to Phase 1 processing 202 described above and illustrated in FIG. 2; and (iv) Phase 4 processing 508 is similar to Phase 2 processing 204 described above and illustrated in FIG. 2.

With this design, (i) Phase 1 processing 502 of the four phase method can be used to restore the edges in the non-outlier regions; (ii) Phase 2 processing 504 of the four phase method can be used to restore texture in the non-outlier regions; (iii) Phase 3 processing 506 of the four phase method can be used to restore the edges in the outlier regions; and (iv) Phase 4 processing 508 of the four phase method can be used to restore texture in the outlier regions.

Thus, in this embodiment, (i) Phase 1 processing 502 and Phase 2 processing 504 are used to restore the non-outlier regions; and (ii) Phase 3 processing 506 and Phase 4 processing 508 are used to restore the outlier regions.

Referring to FIG. 5A, at block 500, the blurred image is read by the algorithm. Subsequently, at block 510, the blurred image is reviewed to identify outlier pixels (regions) and non-outlier pixels (regions). In one embodiment, the outlier regions are highlighted regions (regions where the image sensor was saturated), and the non-outlier regions are non-highlighted regions. For example, pixels in the blurry image having a brightness value over a certain brightness threshold can be labeled as outlier pixels, and pixels having a brightness value under the brightness threshold are labeled as non-outlier pixels. In certain embodiment, pixels in the neighborhood of the outlier pixels can also be labeled as outlier pixels.

After the outlier regions and non-outlier regions are identified, separate processing of these regions can begin. At block 512, of the adaptive fidelity spatial mask M is generated. As a non-exclusive example, the fidelity spatial mask M can be a binary mask having a value of either 0 or 1. In this example, the fidelity spatial mask $M_1$ can have a value of 0 for pixels that are labeled as outlier pixels, and a value of 1 for pixels that are labeled as non-outlier pixels. In this example, (i) the outliers and its neighboring pixels will be assigned the value of 0; and (ii) the remaining pixels will be assigned the value of 1.

Alternatively, the pixels of the fidelity spatial mask M can have values somewhere in the range of 0 to 1. In this example, (i) the outliers and its neighboring pixels can be assigned the value of 0; (ii) the pixels far enough away from the outliers will be assigned the value of 1; and (iii) the remaining pixels will have somewhere between zero and one depending on how far they are from an outlier. This will lead to more smooth transitions. FIG. 5B is a simplified illustration of a portion of a fidelity spatial mask M 550.

Referring back to FIG. 5A, subsequently, at block 502, Phase 1 processing is performed to restore the main edges in the non-outlier regions with a strong emphasis on suppressing ringing. Phase 1 processing 502 here is similar to the Phase 1 processing 202 described above in reference to FIG. 2, except the phase 1 cost function includes the fidelity spatial mask M in the fidelity term(s), in addition to the adaptive regularization spatial mask $N_1$ and Laplacian or Hyper-Laplacian prior regularization. In this embodiment, the fidelity spatial mask M is used to limit deconvolution to the areas far enough from outliers, which suppresses ringing around outliers. Similar to the embodiment described in FIG. 2, Phase 1 processing 502 can include Subphases 1A, 1B, 1C, and etc. with each subsequent Subphase having decreased regularization and an improved adaptive regularization spatial mask.

After Phase 1 processing of the non-outlier regions is complete, Phase 2 processing 504 of the non-outlier regions is performed to restore texture at block 504. Phase 2 processing 504 here is similar to the Phase 2 processing described above in reference to FIG. 2, except the phase 2 cost function includes the fidelity spatial mask M in the fidelity term(s), in addition to the adaptive regularization spatial mask $N_2$, the Gaussian prior regularization, and the spatial prior regularization. In Phase 2 processing 504, the fidelity spatial mask M is used in the fidelity term(s) of the cost function to limit deconvolution to the areas far enough from outliers. This can be used to suppress ringing around outliers, and the outlier areas can get stronger regularization.

As result thereof, the Phase 2 latent sharp image contains relatively few ringing artifacts and noise, and more fine texture. The Phase 2 latent sharp image generated from Phase 2 processing 504 of the non-outlier regions is used to generate the final latent sharp image 516.

Next, at block 506, Phase 3 processing is performed to restore the main edges in the outlier regions with a strong emphasis on suppressing ringing. Phase 3 processing 506 here is similar to the Phase 1 processing 202 described above in reference to FIG. 2, except (i) stronger regularization is used to suppress ringing; and (ii) the fidelity spatial mask M used for Phase 3 processing ("Phase 3 fidelity spatial mask $M_3$") needs to be changed so the outlier regions get restored. For example, the Phase 3 processing cost function could either (i) skip the fidelity spatial mask $M_3$ entirely and restore the entire image, or (ii) use one minus the Phase 1 fidelity spatial mask M as the Phase 3 fidelity spatial mask $M_3$ ($M_3=1-M$) to limit restoration to the outlier regions. Similar to the embodiment described in FIG. 2, Phase 3 processing 506 can include Subphases 3A, 3B, 3C, and etc. with each subsequent Subphase having decreased regularization and an improved adaptive regularization spatial mask.

After Phase 3 processing of the outlier regions is complete, Phase 4 processing is performed to restore texture to the outlier regions at block 508 and generate a Phase 4 latent sharp image. Phase 4 processing 508 here is similar to the Phase 2 processing described above in reference to FIG. 2, except (i) stronger regularization is used to suppress ringing; and (ii) the fidelity spatial mask M used for Phase 4 processing ("Phase 4 fidelity spatial mask $M_4$") needs to be changed so the outlier regions get restored. For example, the Phase 4 processing cost function could either (i) skip the fidelity spatial mask $M_4$ entirely and restore the entire image, or (ii) use one minus the Phase 2 fidelity spatial mask M as the Phase 4 fidelity spatial mask $M_4$ ($M_4=1-M$) to limit restoration to the outlier regions.

Next at block 514, the Phase 2 latent sharp image is merged with the Phase 4 latent sharp image to create the output latent sharp image 516. For example, the outlier areas of the Phase 4 latent sharp image can be combined with the non-outlier areas of the Phase 2 latent sharp image to generate the output latent sharp image 516. With this design, the multi-phase method provided herein can be used to separately deblur the highlight regions, with different parameters from the non-highlight regions.

In one embodiment, the final output (latent sharp image L) can be expressed as follows:

$$L = M_{Blend} L_{Phase2} + (1-M_{Blend}) L_{Phase4}.$$  Equation (21)

In Equation (21) (i) $M_{Blend}$ is a blending mask, (ii) $L_{Phase2}$ is the latent sharp image (i) is $M_{Blend}$ after Phase 2 processing, and (iii) $L_{Phase4}$ is the latent sharp image after Phase 4 processing. In one embodiment, the blending mask $M_{Blend}$ is the same fidelity spatial mask M used in Phase 1 processing 502 and Phase 2 processing 504. With this design, if the mask M is not binary, pixels in areas far enough from outliers are assigned the result of Phase 2 processing 504, and pixels in outlier areas are assigned the result of Phase 4 processing 508, and there is smooth blending in between.

It should be noted that in this embodiment, when there are no outliers in the blurry image (no outliers identified in block 510), Phase 3 and 4 processing 506, 508 can be skipped, and the final output latent sharp image 516 is the Phase 2 latent sharp image.

Further, the user can also choose to (i) skip Phase 3 and 4 processing 506, 508, and (ii) use the Phase 2 latent sharp image as the final output latent sharp image 516, independently of whether or not any outliers are detected. For example, if the PSF is small, the area around the outliers that is left blurry is relatively small and the blur may be less annoying than the ringing artifacts introduced by Phase 3 and 4 processing 506, 508. Further, skipping Phase 3 and 4 processing 506, 508 improves the speed of the algorithm.

One non-exclusive example of a suitable Phase 1 cost function for Phase 1 processing 502 of the non-outlier regions is provided below:

$$c(L) = \alpha_1 \|M(K*L-B)\|_2^2 + \alpha_2(\|M(K*D_x*L-D_x*B)\|_2^2 + \|M(K*D_y*L-D_y*B)\|_2^2) + \omega_1(\|N_1(D_x*L)\|_1^1 + \|N_1(D_y*L)\|_1^1)$$  Equation (22)

In one non-exclusive example, the fidelity weight parameter $\alpha_1$ can be set to be equal to 0.001 ($\alpha_1=0.001$), and the fidelity weight parameter $\alpha_2$ can be set to be equal to 1 ($\alpha_2=1$). As a result thereof, the cost function relies mainly on fidelity terms with derivatives which help to reduce ringing. In Equation (22), M is an adaptive fidelity spatial mask, $N_1$ is an adaptive regularization spatial mask, and $\omega_1$ is a regularization weight in the smooth areas.

The cost function of Equation (22) can be minimized by variable splitting and alternating minimization. In certain instances, approximately 6-8 iterations are needed to suppress ringing. The cost function of Equation (22) after splitting can be expressed as follows:

$$c(L,R,W_x,W_y) = \alpha_1(\|MR-B\|_2^2 + \gamma\|K*L-R\|_2^2) + \alpha_2(\|M(D_x*R-D_x*B)\|_2^2 + \|M(D_y*R-D_y*B)\|_2^2 + \gamma(\|D_x*K*L-D_x*R\|_2^2 + \|D_y*K*L-D_y*R\|_2^2)) + \omega_1(\|N_1 W_x\|_1^1 + \|N_1 W_y\|_1^1 + \beta(\|W_x-D_x*L\|_2^2 + \|W_y-D_y*L\|_2^2)).$$  Equation (23).

As a non-exclusive example, penalty weights $\gamma=\beta=1$ can be used in the first iteration, and increased by the factor $\sqrt{2}$(for $\gamma$), and respectively 2 (for $\beta$) in each iteration.

The minimization formulas are as follows:

$$R = \frac{MB + \gamma K*L}{M+\gamma}$$  Equation (24)

$$W_x = sthr\left(D_x*L, \frac{N}{2\beta}\right),$$  Equation (25)

$$W_y = sthr\left(D_y*L, \frac{N}{2\beta}\right).$$  Equation (26)

Further, there is a closed form formula for the minimum of the latent sharp image cost function of Equation (23) as follows:

$$F(L) = \frac{(\alpha 1 + \alpha 2D)\overline{F(K)}F(R) + \frac{\omega_1 \beta}{\gamma}(\overline{F(D_x)}F(W_x) + \overline{F(D_y)}F(W_y))}{(\alpha 1 + \alpha 2D)\overline{F(K)}F(K) + \frac{\omega_1 \beta}{\gamma}D}.$$  Equation (27)

In Equation (26), D has the same value as in Equation (10).

One non-exclusive example of a suitable Phase 2 cost function for Phase 2 processing 504 of the non-outlier regions is provided below:

$$c(L) = \alpha_1 \|M(K*L-B)\|_2^2 + \alpha_2(\|M(K*D_x*L-D_x*B)\|_2^2 + \|M(K*D_y*L-D_y*B)\|_2^2) + \omega_2(\|N_2(D_x*L)\|_2^2 + \|N_2(D_y*L)\|_2^2) + \sigma_1\|L-L_{Phase1}\|_2^2 + \sigma_2(\|D_x*L-D_x*L_{Phase1}\|_2^2 + \|D_y*L-D_y*L_{Phase1}\|_2^2).$$  Equation (28)

The Phase 2 cost function of Equation (28) can be minimized by variable splitting and alternating minimization. In certain instances, no more than approximately 3 iterations seem to be needed. The cost function of Equation (28) can be expressed after splitting as follows:

$$c(L,R,W_x,W_y) = \alpha_1(\|M(R-B)\|_2^2 + \gamma\|K*L-R\|_2^2) + \alpha_2(\|M(D_x*R-D_x*B)\|_2^2 + \|M(D_y*R-D_y*B)\|_2^2 + \gamma(\|D_x*K*L-D_x*R\|_2^2 + \|D_y*K*L-D_y*R\|_2^2)) + \omega_2(\|N_2W_x\|_1 + \|N_2W_y\|_1 + \beta(\|W_x-D_x*L\|_2^2 + \|W_y-D_y*L\|_2^2)) + \sigma_1\|L-L_{Phase1}\|_2^2 + \sigma_2(\|D_x*L-D_x*L_{Phase1}\|_2^2 + \|D_y*L-D_y*L_{Phase1}\|_2^2).$$

Equation (29)

In one, non-exclusive embodiment, penalty weights $\gamma=\beta=1$ are used in first iteration, and increased by the factor $\sqrt{2}$(for $\alpha$) and respectively 2 (for $\beta$) in each iteration.

The following minimization formulas can be utilized:

$$R = \frac{MB + \gamma K * L}{M + \gamma}$$

Equation (30)

$$W_x = \frac{D_x * L}{1 + \frac{1}{\beta}N2^2},$$

Equation (31)

$$W_y = \frac{D_y * L}{1 + \frac{1}{\beta}N2^2}$$

Equation (32)

Further, there is a closed form formula for the minimum of the latent sharp image cost function of Equation (29) as follows:

$$F(L) = \frac{F(L_{Phase1}) + \omega_2 \frac{\beta}{\gamma}(\overline{F(D_x)}F(W_x) + \overline{F(D_y)}F(W_y))}{(\alpha 1 + \alpha 2 D)\overline{F(K)}F(K) + (\sigma 1 + \sigma 2 D) + \omega_2 \frac{\beta}{\gamma}D}$$

Equation (33)

In Equation (33), D has the same value as in Equation (10).

One non-exclusive example of a suitable Phase 3 cost function for Phase 3 processing 506 of the outlier regions is provided below:

$$c(L) = \alpha_1\|(K*L-B)\|_2^2 + \alpha_2(\|(K*D_x*L-D_x*B)\|_2^2 + \|(K*D_y*L-D_y*B)\|_2^2) + \omega_1(\|N_1(D_x*L)\|_1 + \|N_1(D_y*L)\|_1).$$

Equation (34)

It should be noted that Equation (34) is the same as Equation (4) provided above. In this Phase 3 cost function, no fidelity spatial mask $M_3$ is used. The Phase 3 cost function of Equation (34) can be minimized iteratively, and one possibility includes variable splitting as provided above in Equations 6, 7, and 9 with alternating minimization. It should also be noted that the adaptive regularization spatial mask $N_1$ can be calculated using the Phase 2 latent sharp image. It should also be noted that the restoration in highlight areas uses more regularization and is thus more crude.

In Phase 4 processing 508, some texture is resorted in and around the outliers. One non-exclusive example of a suitable Phase 4 cost function for Phase 4 processing 508 of the outlier regions is provided below:

Given blurry image B and PSF kernel K, the Phase 4 cost function can be expressed as follows:

$$c(L) = \alpha_1\|K*L-B\|_2^2 + \alpha_2(\|K*D_x*L-D_x*B\|_2^2 + \|K*D_y*L-D_y*B\|_2^2) + \omega_2(\|N_2(D_x*L)\|_2^2 + \|N_2(D_y*L)\|_2^2) + \sigma_1\|L-L_{Phase3}\|_2^2 + \sigma_2(\|D_x*L-D_x*L_{Phase3}\|_2^2 + \|D_y*L-D_y*L_{Phase3}\|_2^2).$$

Equation (35)

It should be noted that Equation (35) is somewhat similar to Equation (11) provided above. In this Phase 4 cost function, no fidelity spatial mask $M_4$ is used. The Phase 4 cost function of Equation (35) can be minimized iteratively, and one possibility includes variable splitting somewhat similar to Equations 13-15 with alternating minimization. In one embodiment, there is a closed form formula for the minimum as follows:

$$F(L) = \frac{F(L_{Phase3}) + \omega_2\beta(\overline{F(D_x)}F(W_x) + \overline{F(D_y)}F(W_y))}{(\alpha 1 + \alpha 2 D)\overline{F(K)}F(K) + (\sigma 1 + \sigma 2 D) + \omega_2\beta D}.$$

Equation (36)

It should be noted that Phase 4 cost function of Equation 35 contains the option to post-process the latent sharp image in each iteration, by limiting the difference between L and $L_{Phase3}$. The idea was to reduce ringing, but, in certain instances, it causes bad posterization. Therefore this option can be switched off by default.

Figure 6A:
FIG. 6A illustrates a blurry image.
Figure 6B:
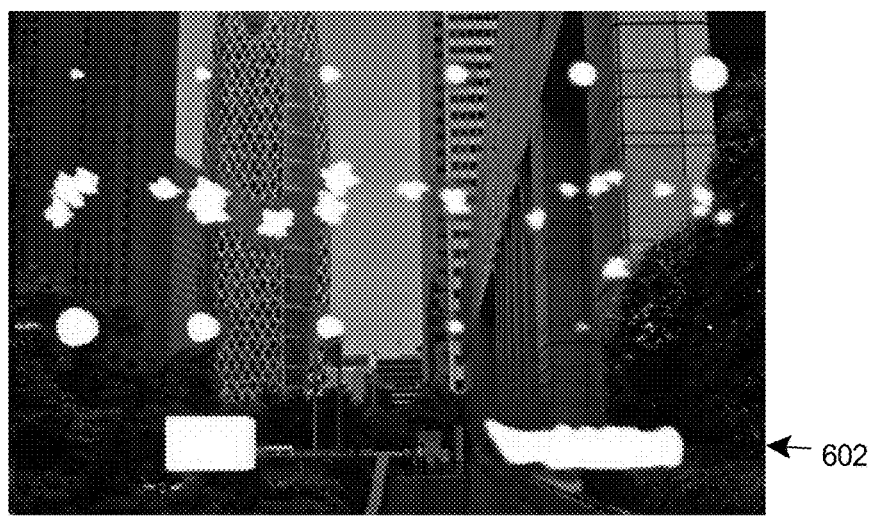
FIG. 6B illustrates a Phase 2 latent sharp image.

FIG. 6A is a simplified view of a blurry image 600 that includes highlighted (outlier) regions 610 (illustrated in white), and non-highlighted (non-outlier) regions 612. FIG. 6B is a simplified view of a Phase 2 latent sharp image 602. At the completion of Phase 2 processing, no outlier region restoration has occurred.

Figure 6C:
FIG. 6C illustrates a final latent sharp image generated by the present invention.

FIG. 6C is a simplified view of the final latent sharp image 604 that was generated by combining the Phase 2 latent sharp image 602 (illustrated in FIG. 6B) with the Phase 4 latent sharp image. The final latent sharp image 604 includes outlier region restoration.

With reference to FIGS. 6B and 6C, the results of Phase 2 processing contain very little ringing, but the outlier shape is not properly restored and the areas around outliers remain blurry. Phase 4 processing helps to restore outlier shape and some texture around outliers.

In yet another embodiment, the present invention is directed to a multiple phase, non-blind deconvolution method with outlier processing in the Luminance-Chrominance Color Space. As provided herein, deblurred images commonly suffer from strong ringing artifacts that are caused by departures from the linear image formation and blurring model, inaccuracy of the PSF, and other factors. Thus, the ringing artifacts are extremely hard to avoid. Further, as provided herein, when deblurring is applied separately to each color channel of RGB (red, blue, green color space) image, the ringing artifacts can have a strong color. Thus, color artifacts can be more conspicuous and annoying.

In one embodiment, the present invention reduces the color artifacts by performing deblurring in some color space that separates luminance (brightness component) from chrominance (color components). In this embodiment, because, the human visual system is less sensitive to chrominance sharpness, the regularization can be increased for the chrominance channels, to reduce color ringing. Further, the deblurred luminance channel can be used for generating the adaptive regularization masks for chrominance channels.

Moreover, in certain embodiments, the number of phases can be reduced for the chrominance channels. This will speed up the algorithm.

Figure 7:
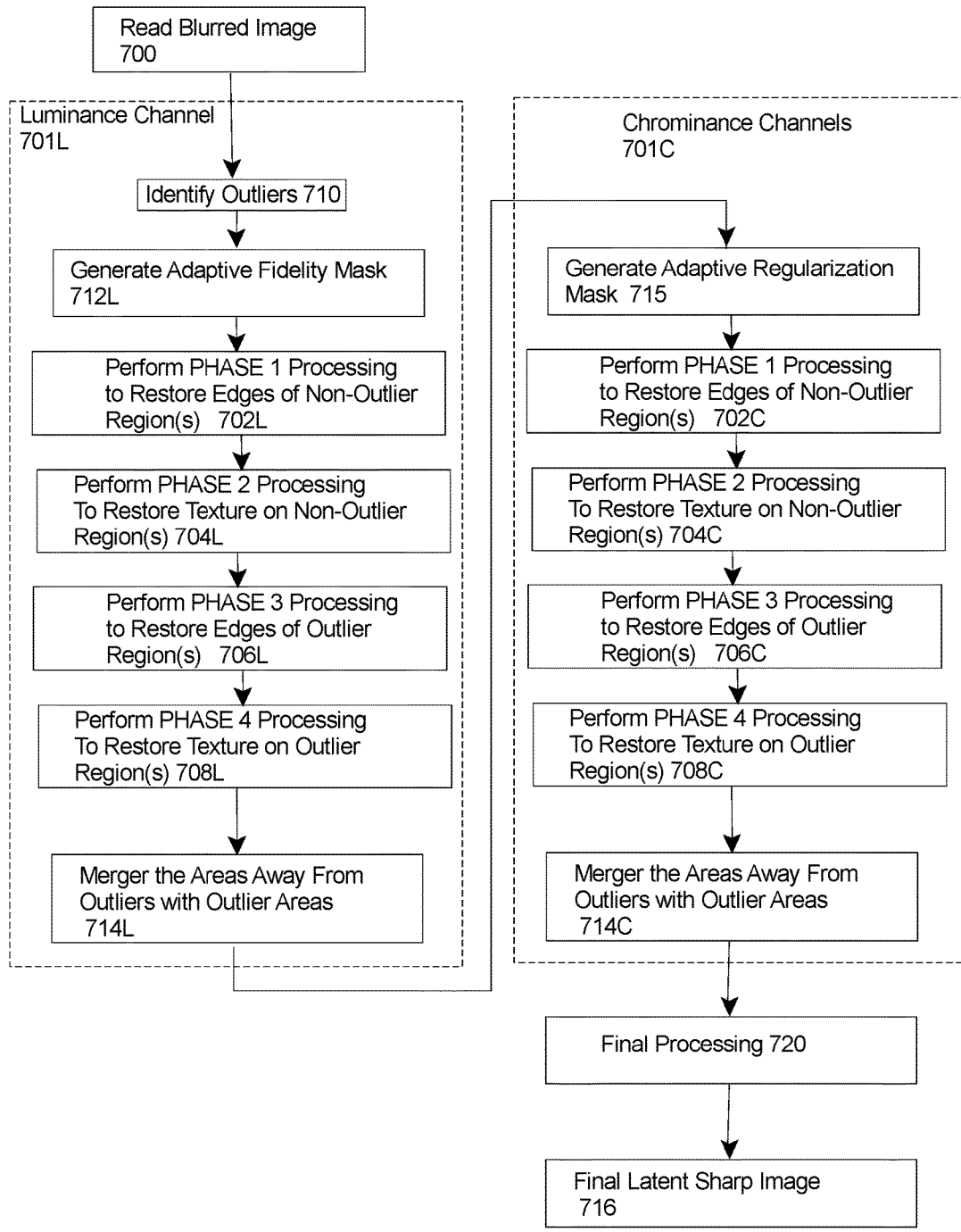
FIG. 7 is an algorithm flowchart for a multi-phase, non-blind deconvolution method.

FIG. 7 is an algorithm flowchart for a multi-phase, non-blind deconvolution method in performed primarily in the YCbCr color space. At step 700, the blurred image is inputted into the system, the raw image data is read, the raw image data is demosaiced, and the image is converted to a color space that includes luminance and chrominance channels (e.g. the YCbCr color space). In one embodiment, the multi-phase approach is the 4-phase approach described above and illustrated in FIG. 5 is performed on the luminance channel 701L and subsequently on the two chrominance channels 701C. It should be noted that either the Cb chrominance channel or the Cr chrominance channel can be referred to as a first or second chrominance channel.

More specially, the blurred image is inputted into block 701L, and processing of the luminance channel begins. At block 710, the blurred image is reviewed to identify outlier pixels (regions) and non-outlier pixels (regions) (similar to block 510). At block 712L, the adaptive fidelity spatial mask M is generated (similar to block 512).

At block 702L, Phase 1 processing is performed on the luminance channel to restore the main edges in the non-outlier regions with a strong emphasis on suppressing ringing (similar to block 502). Phase 1 processing 702L includes the phase 1 cost function the includes the fidelity spatial mask M in the fidelity term(s), in addition to the adaptive regularization spatial mask $N_1$ and Laplacian or Hyper-Laplacian prior regularization. Phase 1 processing 702L can include Subphases 1A, 1B, 1C, and etc. with each subsequent Subphase having decreased regularization and an improved adaptive regularization spatial mask.

Next, Phase 2 processing of the non-outlier regions on the luminance channel is performed to restore texture at block 704L (similar to block 504) and generate the Phase 2 luminance latent sharp image ($L_{Ph2\_Lum}$). Phase 2 processing includes the phase 2 cost function having the fidelity spatial mask M in the fidelity term(s), in addition to the adaptive regularization spatial mask $N_2$, the Gaussian prior regularization, and the spatial prior regularization Subsequently, at block 706L, Phase 3 processing on the luminance channel is performed to restore the main edges in the outlier regions with a strong emphasis on suppressing ringing (similar to block 506). Phase 3 processing 706L can include Subphases 3A, 3B, 3C, and etc. with each subsequent Subphase having decreased regularization and an improved adaptive regularization spatial mask.

Next, at block 708L, Phase 4 processing on the luminance channel is performed to restore texture to the outlier regions and generate a Phase 4 luminance latent sharp image ($L_{Ph4\_Lum}$) (similar to block 508).

Figure 8A:
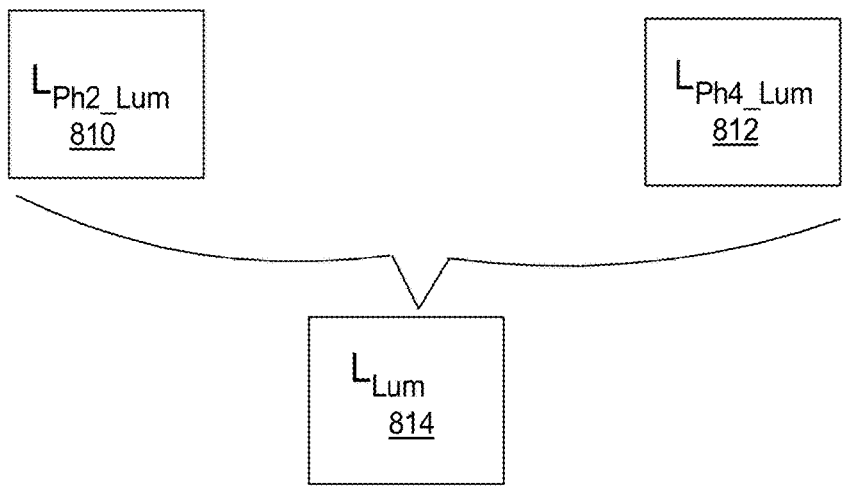
FIG. 8A is a simplified illustration of a Phase 2 luminance latent sharp image ($L_{Ph2\_Lum}$), a Phase 4 luminance latent sharp image ($L_{Ph4\_Lum}$), and a luminance channel latent sharp image ($L_{Lum}$)

Next at block 714L, and with reference to FIG. 8A, the Phase 2 luminance latent sharp image ($L_{Ph2\_Lum}$) 810 is merged with the Phase 4 luminance latent sharp image ($L_{Ph4\_Lum}$) 812 to create the luminance channel latent sharp image ($L_{Lum}$) 814. For example, the outlier areas of the Phase 4 latent sharp image can be combined with the non-outlier areas of the Phase 2 latent sharp image to generate the luminance channel latent sharp image ($L_{Lum}$) 814.

Referring back to FIG. 7, at block 701C, processing 701C of the two chrominance channels begins. At block 715, of the adaptive regularization spatial mask $N_1$ is updated/generated using the luminance channel latent sharp image ($L_{Lum}$) 814.

At block 702C, Phase 1 processing is performed on each chrominance channel to restore the main edges in the non-outlier regions with a strong emphasis on suppressing ringing (similar to block 502). For each chrominance channel, Phase 1 processing 702L can include using the phase 1 cost function that includes the fidelity spatial mask M in the fidelity term(s), in addition to the adaptive regularization spatial mask $N_1$ and Laplacian or Hyper-Laplacian prior regularization. For each chrominance channel, Phase 1 processing 702C can include Subphases 1A, 1B, 1C, and etc. with each subsequent Subphase having decreased regularization and an improved adaptive regularization spatial mask.

Next, Phase 2 processing of the non-outlier regions is performed on the two chrominance channels to restore texture at block 704C (similar to block 504), and generate (i) a Phase 2 Cb chrominance latent sharp image ($L_{Ph2\_CbChr}$), and (ii) a Phase 2 Cr chrominance latent sharp image ($L_{Ph2\_CrChr}$). For each chrominance channel, Phase 2 processing can include using the phase 2 cost function having the fidelity spatial mask M in the fidelity term(s), in addition to the adaptive regularization spatial mask $N_1$, the Gaussian prior regularization, and the spatial prior regularization.

Subsequently, at block 706C, Phase 3 processing is performed on the two chrominance channels to restore the main edges in the outlier regions with a strong emphasis on suppressing ringing (similar to block 506). For each chrominance channel, Phase 3 processing 706C can include Subphases 3A, 3B, 3C, and etc. with each subsequent Subphase having decreased regularization and an improved adaptive regularization spatial mask.

Next, at block 708C, Phase 4 processing (similar to block 508) is performed on each chrominance channel, to restore texture to the outlier regions, and generate (i) a Phase 4 Cb chrominance latent sharp image ($L_{Ph4\_CbChr}$), and (ii) a Phase 4 Cr chrominance latent sharp image ($L_{Ph4\_CrChr}$).

Figure 8B:
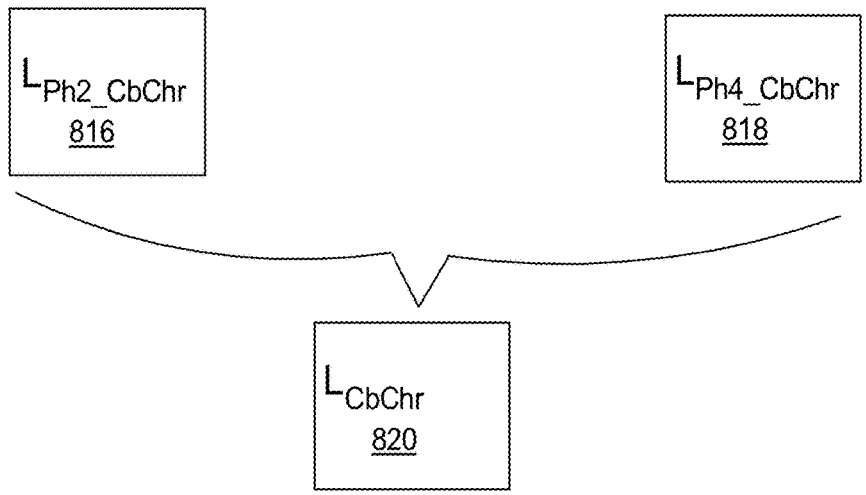
FIG. 8B is a simplified illustration of a Phase 2 Cb chrominance latent sharp image ($L_{Ph2\_CbChr}$), a Phase 4 Cb chrominance latent sharp image ($L_{Ph4\_CbChr}$), and a Cb chrominance channel latent sharp image ($L_{CbChr}$)
Figure 8C:
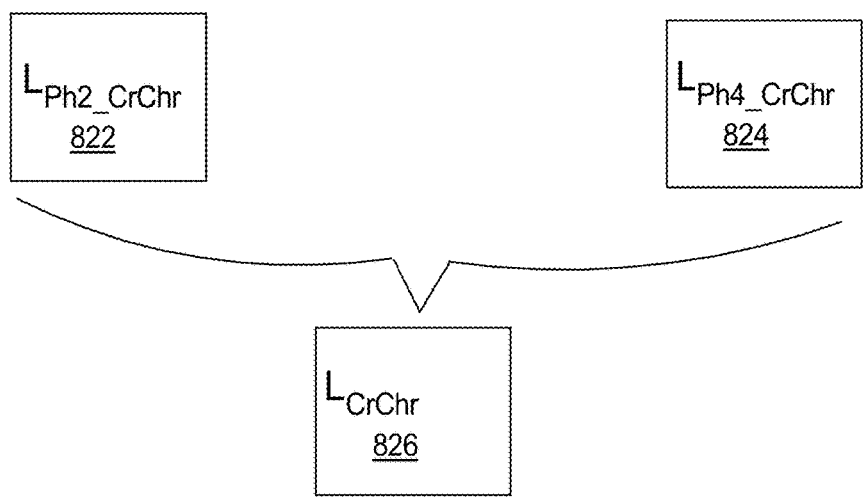
FIG. 8C is a simplified illustration of a Phase 2 Cr chrominance latent sharp image ($L_{Ph2\_CrChr}$), a Phase 4 Cr chrominance latent sharp image ($LPh_{4\_CrChr}$), and a Cr chrominance channel latent sharp image ($L_{CrChr}$)

Next at block 714C, (i) with reference to FIG. 8B, the Phase 2 Cb chrominance latent sharp image ($L_{Ph2\_CbChr}$) 816 is merged with the Phase 4 Cb chrominance latent sharp image ($L_{Ph4\_CbChr}$) 818 to create a Cb chrominance channel latent sharp image ($L_{CbChr}$) 820; and (ii) with reference to FIG. 8C, the Phase 2 Cr chrominance latent sharp image ($L_{Ph2\_CrChr}$) 822 is merged with the Phase 4 Cr chrominance latent sharp image ($L_{Ph4\_CrChr}$) 824 to create a Cr chrominance channel latent sharp image ($L_{CrChr}$) 826. For example, the non-outlier areas of the Phase 2 Cb chrominance latent sharp image ($L_{Ph2\_CbChr}$) 816 can be combined with the outlier areas of the Phase 4 Cb chrominance latent sharp image ($L_{Ph4\_CbChr}$) 818 to create the Cb chrominance channel latent sharp image ($L_{CbChr}$) 820. Similarly, the non-outlier areas of the Phase 2 Cr chrominance latent sharp image ($L_{Ph2\_CrChr}$) 822 can be combined with the outlier areas of the Phase 4 Cr chrominance latent sharp image ($L_{Ph4\_CrChr}$) 824 to create the Cr chrominance channel latent sharp image ($L_{CrChr}$) 826.

Figure 8D:
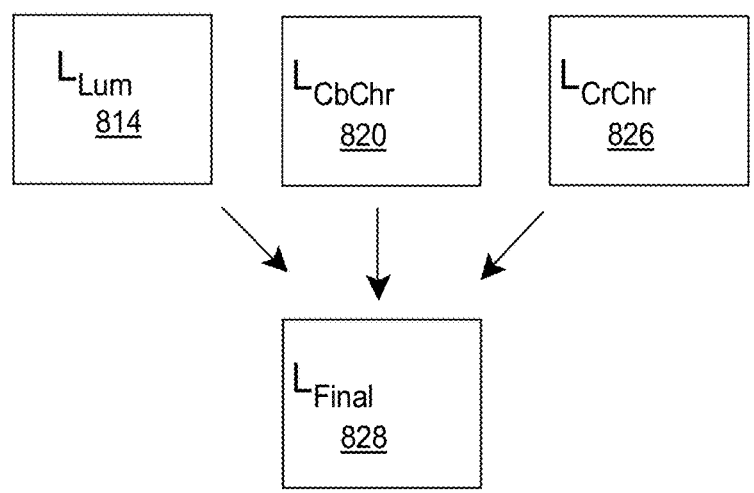
FIG. 8D is a simplified illustration of the luminance channel latent sharp image ($L_{Lum}$), the Cb chrominance channel latent sharp image ($L_{CbChr}$), the Cr chrominance channel latent sharp image ($L_{CrChr}$) and a final latent sharp image ($L_{Final}$).

Subsequently, at block 720 final processing occurs. In this block, with reference to FIG. 8D, the luminance channel latent sharp image ($L_{Lum}$) 814, the Cb chrominance channel latent sharp image ($L_{CbChr}$) 820, and the Cr chrominance channel latent sharp image ($L_{CrChr}$) 826 can be converted to the RGB color space, gamma and contrast curves can be applied, and other operations (e.g. sharpening) is performed to generate the final latent sharp image ($L_{Final}$) 828. Finally, at block 716 the final latent sharp image ($L_{Final}$) 828 is output.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for deblurring a blurry image that includes main edges and texture, the method comprising the steps of:
    identifying any outlier regions in the blurry image;

creating a fidelity term mask based on the identified outlier regions;

performing a first phase of deconvolution to reconstruct the main edges; wherein the step of performing a first phase of deconvolution includes using a first phase algorithm that uses the fidelity term mask; and performing a second phase of deconvolution to reconstruct the texture; wherein the step of performing a second phase of deconvolution includes using a second phase algorithm that uses the fidelity term mask.

2. The method of claim 1 wherein the step of performing a first phase includes generating a first phase latent sharp image; wherein the step of performing a second phase includes performing the second phase of deconvolution with a second phase regularization spatial mask to reconstruct the texture; and further comprising the step of generating the second phase regularization spatial mask using the first phase latent sharp image.

3. The method of claim 2 wherein (i) the step of performing a first phase includes performing the first phase of deconvolution with a first phase regularization spatial mask to reconstruct the main edges using a first phase algorithm that assumes a Laplacian or Hyper-Laplacian prior and includes the first phase regularization spatial mask to suppress ringing artifacts and noise, and (ii) the step of performing a second phase includes using a second phase algorithm that assumes a Gaussian prior, and includes a spatial prior, and the second phase regularization spatial mask to help to recover image texture without introducing strong ringing artifacts.

4. The method of claim 3 wherein (i) the step of performing a first phase includes using the first phase algorithm that assumes a Laplacian or Hyper-Laplacian prior and includes the first phase regularization spatial mask to suppress ringing artifacts and noise, and (ii) the step of performing a second phase includes using the second phase algorithm that assumes a Gaussian prior, a spatial prior, and includes the second phase regularization spatial mask to help to recover image texture without introducing strong ringing artifacts.

5. The method of claim 3 further comprising the steps of (i) performing a third phase of deconvolution on the blurry image with a third phase regularization spatial mask to reconstruct the main edges in at least one of the outlier regions to generate a third phase latent sharp image; (ii) performing a fourth phase of deconvolution with a fourth phase regularization spatial mask to reconstruct the texture in at least one of the outlier regions to generate a fourth phase latent sharp image, the fourth phase regularization spatial mask being different from the third phase regularization spatial mask; and (iii) identifying any non-outlier regions in the blurry image; wherein the first phase of deconvolution reconstructs the main edges in at least one of the non-outlier regions; and wherein the second phase of deconvolution reconstructs the texture in at least one of the non-outlier regions.

6. The method of claim 5 wherein the step of performing a second phase includes generating a second phase latent sharp image; and further comprising the step of merging the second phase latent sharp image with the fourth phase latent sharp image to create an output latent sharp image.

7. The method of claim 5 wherein (i) the step of performing a first phase includes using the first phase algorithm that assumes a Laplacian or Hyper-Laplacian prior and includes the first phase regularization spatial mask to suppress ringing artifacts and noise, (ii) the step of performing a second phase includes using the second phase algorithm that assumes a Gaussian prior, and includes a spatial prior, and the second phase regularization spatial mask to help to recover image texture without introducing strong ringing artifacts; (iii) the step of performing a third phase includes using a third phase algorithm that assumes a Laplacian or Hyper-Laplacian prior and includes the third phase regularization spatial mask to suppress ringing artifacts and noise, and (iv) the step of performing a fourth phase includes using a fourth phase algorithm that assumes a Gaussian prior, and includes a spatial prior, and the fourth phase regularization spatial mask to help to recover image texture without introducing strong ringing artifacts.

8. The method of claim 1 further comprising the steps of (i) converting the blurry image to a color space that includes a luminance channel and a chrominance channel, (ii) performing the first phase of deconvolution on the luminance channel of the blurry image to reconstruct the main edges of the luminance channel; (iii) performing the second phase of deconvolution on the luminance channel to reconstruct the texture; (iv) generating a second phase regularization spatial mask using the luminance channel, (v) performing the first phase of deconvolution on the chrominance channel of the blurry image to reconstruct the main edges of the chrominance channel; and (vi) performing the second phase of deconvolution on the chrominance channel to reconstruct the texture in edges of the chrominance channel.

9. A method for deblurring a blurry image with a known or estimated point spread function, the method comprising the steps of:

identifying any outlier regions in the blurry image;

creating a fidelity term mask based on the identified outlier regions;

performing a first phase of deconvolution with a first latent sharp image cost function that assumes a Laplacian or Hyper-Laplacian prior regularization, wherein the step of performing a first phase of deconvolution includes using the fidelity term mask in the first latent sharp image cost function; and performing a second phase of deconvolution with a second latent sharp image cost function that assumes a Gaussian prior regularization, wherein the step of performing a second phase of deconvolution includes using the fidelity term mask in the second latent sharp image cost function.

10. The method of claim 9 wherein the step of performing a first phase of deconvolution includes using a first phase regularization spatial mask in the first latent sharp image cost function and generating a first phase latent sharp image; wherein the step of performing a second phase of deconvolution includes using a second phase regularization spatial mask in the second latent sharp image cost function; and wherein the method includes generating the second phase regularization spatial mask using the first phase latent sharp image.

11. The method of claim 9 further comprising the steps of (i) performing a third phase of deconvolution on the blurry image with a third phase regularization spatial mask to reconstruct the main edges in at least one of the outlier regions to generate a third phase latent sharp image; (ii) performing a fourth phase of deconvolution with a fourth phase regularization spatial mask to reconstruct the texture in at least one of the outlier regions to generate a fourth phase latent sharp image, the fourth phase regularization spatial mask being different from the third phase regularization spatial mask; and (iii) identifying any non-outlier regions in the blurry image; wherein the first phase of deconvolution reconstructs the main edges in at least one of the non-outlier regions; and wherein the second phase of deconvolution reconstructs the texture in at least one of the non-outlier regions.

12. The method of claim 11 wherein the step of performing a second phase includes generating a second phase latent sharp image; and further comprising the step of merging the second phase latent sharp image with the fourth phase latent sharp image to create the output latent sharp image.

13. The method of claim 11 wherein (i) the step of performing a third phase includes using a third phase algorithm that assumes a Laplacian or Hyper-Laplacian prior and includes the third phase regularization spatial mask to suppress ringing artifacts and noise, and (ii) the step of performing a fourth phase includes using a fourth phase algorithm that assumes a Gaussian prior, and includes a spatial prior, and the fourth phase regularization spatial mask to help to recover image texture without introducing strong ringing artifacts.

14. A system for deblurring a blurry image that includes main edges and texture, the system comprising:
a control system that includes a processor that (i) identifies any outlier regions in the blurry image; (ii) creates a fidelity term mask based on the identified outlier regions; (iii) performs a first phase of deconvolution to reconstruct the main edges; wherein the first phase of deconvolution uses a first phase algorithm that uses the fidelity term mask; and (iv) performs a second phase of deconvolution to reconstruct the texture; wherein the second phase of deconvolution uses a second phase algorithm that uses the fidelity term mask.

15. The system of claim 14 wherein the control system (i) generates a first phase latent sharp image; (ii) generates the second phase regularization spatial mask using the first phase latent sharp image; and (iii) performs the second phase of deconvolution with a second phase regularization spatial mask to reconstruct the texture.

16. The system of claim 15 wherein the control system (i) performs the first phase of deconvolution with a first phase regularization spatial mask to reconstruct the main edges using a first phase algorithm that assumes a Laplacian or Hyper-Laplacian prior and includes the first phase regularization spatial mask to suppress ringing artifacts and noise, and (ii) performs the second phase of deconvolution using a second phase algorithm that assumes a Gaussian prior, and includes a spatial prior, and the second phase regularization spatial mask to help to recover image texture without introducing strong ringing artifacts.

17. The system of claim 16 wherein the control system (i) performs the first phase of deconvolution using the first phase algorithm that assumes a Laplacian or Hyper-Laplacian prior and includes the first phase regularization spatial mask to suppress ringing artifacts and noise, and (ii) performs the second phase of deconvolution using the second phase algorithm that assumes a Gaussian prior, a spatial prior, and includes the second phase regularization spatial mask to help to recover image texture without introducing strong ringing artifacts.

18. The system of claim 16 wherein the control system further (i) performs a third phase of deconvolution on the blurry image with a third phase regularization spatial mask to reconstruct the main edges in at least one of the outlier regions to generate a third phase latent sharp image; (ii) performs a fourth phase of deconvolution with a fourth phase regularization spatial mask to reconstruct the texture in at least one of the outlier regions to generate a fourth phase latent sharp image, the fourth phase regularization spatial mask being different from the third phase regularization spatial mask; and (iii) identifies any non-outlier regions in the blurry image; wherein the first phase of deconvolution reconstructs the main edges in at least one of the non-outlier regions; and wherein the second phase of deconvolution reconstructs the texture in at least one of the non-outlier regions.

19. The system of claim 18 wherein the control system further (i) generates a second phase latent sharp image; and (ii) merges the second phase latent sharp image with the fourth phase latent sharp image to create an output latent sharp image.

20. The system of claim 18 wherein the control system (i) performs the first phase of deconvolution using the first phase algorithm that assumes a Laplacian or Hyper-Laplacian prior and includes the first phase regularization spatial mask to suppress ringing artifacts and noise, (ii) performs the second phase using the second phase algorithm that assumes a Gaussian prior, and includes a spatial prior, and the second phase regularization spatial mask to help to recover image texture without introducing strong ringing artifacts; (iii) performs the third phase of deconvolution using a third phase algorithm that assumes a Laplacian or Hyper-Laplacian prior and includes the third phase regularization spatial mask to suppress ringing artifacts and noise, and (iv) performs the fourth phase of deconvolution using a fourth phase algorithm that assumes a Gaussian prior, and includes a spatial prior, and the fourth phase regularization spatial mask to help to recover image texture without introducing strong ringing artifacts.

* * * * *